United States Patent
Oh

(10) Patent No.: US 10,209,114 B2
(45) Date of Patent: Feb. 19, 2019

(54) WATER METER AND WATER SUPPLY MANAGEMENT SYSTEM USING SAME

(71) Applicant: USOL CO., LTD., Daejeon (KR)

(72) Inventor: Kwang Suhk Oh, Daejeon (KR)

(73) Assignee: USOL CO., LTD., Daejeon (KR)

( * ) Notice: Subject to any disclaimer, the term of this patent is extended or adjusted under 35 U.S.C. 154(b) by 268 days.

(21) Appl. No.: 15/400,454

(22) Filed: Jan. 6, 2017

(65) Prior Publication Data
US 2017/0115151 A1    Apr. 27, 2017

Related U.S. Application Data

(63) Continuation of application No. PCT/KR2015/008460, filed on Aug. 12, 2015.

(30) Foreign Application Priority Data

Nov. 28, 2014  (KR) .................. 10-2014-0169075

(51) Int. Cl.
*G01M 3/24* (2006.01)
*G01F 15/06* (2006.01)
(Continued)

(52) U.S. Cl.
CPC ............. *G01F 15/063* (2013.01); *F17D 5/06* (2013.01); *G01F 15/00* (2013.01);
(Continued)

(58) Field of Classification Search
CPC ...... G01M 3/243; G01M 3/24; G01M 3/2807; G01M 3/26; G01M 3/28
See application file for complete search history.

(56) References Cited

U.S. PATENT DOCUMENTS 5,333,501 A * 8/1994 Okada .................. G01M 3/243
                                                   73/40.5 A
5,602,327 A * 2/1997 Torizuka ................ H04R 17/00
                                                   73/40.5 A
(Continued)

FOREIGN PATENT DOCUMENTS

JP         2000-268286 A    9/2000
KR    10-2002-0084769 A    11/2002
(Continued)

*Primary Examiner* — David A Rogers
(74) *Attorney, Agent, or Firm* — Mintz Levin Cohn Ferris Glovsky and Popeo, P.C.; Kongsik Kim

(57) ABSTRACT

Disclosed is a water meter including: a reading unit provided in a meter body to display a flow of water supplied through a water pipe; a sensing unit provided in the meter body to detect vibrations transmitted through the water pipe; a conversion unit for converting the vibrations detected by the sensing unit into electric signals; a frequency analysis unit for analyzing frequency components of the electric signals converted by the conversion unit; a comparison-processing unit for comparing each of the frequency components of the analyzed electric signals to a predetermined set-up level, and identifying whether each of the frequency components exceeds the predetermined set-up level; a determination-control unit for calculating a leakage probability on a basis of results from the comparison-processing unit; and an output unit for outputting a determination result of the determination-control unit as at least one of a video signal and an audio signal.

11 Claims, 8 Drawing Sheets

(51) Int. Cl.
    *G01H 17/00*     (2006.01)
    *G01F 15/00*     (2006.01)
    *G06Q 50/06*     (2012.01)
    *G01F 25/00*     (2006.01)
    *F17D 5/06*     (2006.01)

(52) U.S. Cl.
    CPC ......... *G01F 25/0092* (2013.01); *G01H 17/00* (2013.01); *G01M 3/24* (2013.01); *G01M 3/243* (2013.01); *G06Q 50/06* (2013.01)

(56) References Cited

U.S. PATENT DOCUMENTS

| | | | | |
|---|---|---|---|---|
| 5,708,195 A * | 1/1998 | Kurisu | ...................... | F17D 5/02 340/605 |
| 5,756,898 A * | 5/1998 | Diatschenko | .......... | G01B 17/02 73/40.5 A |
| 7,007,545 B1 * | 3/2006 | Martinek | .............. | G01M 3/243 73/40.5 A |
| 7,891,246 B2 * | 2/2011 | Lander | .................. | G01M 3/243 702/51 |
| 8,096,167 B2 * | 1/2012 | Kaji | ...................... | G01M 3/243 381/94.1 |
| 8,665,101 B2 * | 3/2014 | Solomon | ............... | G01M 3/243 340/605 |
| 9,939,344 B2 * | 4/2018 | Bracken | ............... | G01M 3/243 |
| 2009/0188302 A1 * | 7/2009 | Rolff | .................... | G01M 3/207 73/40.7 |
| 2011/0302995 A1 * | 12/2011 | Lebeau | ................... | G01F 1/696 73/40 |
| 2014/0150554 A1 * | 6/2014 | Rada | ....................... | G01M 3/00 73/592 |
| 2016/0011072 A1 * | 1/2016 | Hale | ....................... | G01M 3/24 702/48 |

FOREIGN PATENT DOCUMENTS

| | | |
|---|---|---|
| KR | 10-0947246 B1 | 3/2010 |
| KR | 10-0975566 B1 | 8/2010 |
| KR | 10-1062361 B1 | 9/2011 |
| KR | 10-1185368 B1 | 9/2012 |
| KR | 20140063380 A * | 5/2014 |

* cited by examiner

WATER METER AND WATER SUPPLY MANAGEMENT SYSTEM USING SAME

CROSS-REFERENCE TO RELATED APPLICATIONS

The present application is a continuation application of International Application No. PCT/KR2015/008460 filed on Aug. 12, 2015, which claims priority to Korean Application No. 10-2014-0169075 filed on Nov. 28, 2014, which applications are incorporated herein by reference.

TECHNICAL FIELD

The present invention relates generally to a water meter. More particularly, the present invention relates to a water meter and a water supply management system using the same, in which usage of tap water is calculated, and a leak is detected while tap water is supplied from a water purification plant to end-use consumers (homes, offices, plants, public places, etc.).

BACKGROUND ART

In general, tap water is supplied to each district of a city through a water main after being purified at the water purification plant, and in each district, tap water is supplied to blocks, such as a medium block, a small block, and so on.

Further, in a house, a built-up area of commercial buildings, and the like, tap water is supplied to an end user through a small pipe connected to the water main buried under the road. Here, the small pipe is referred to as 'a branch line', and most cases of water leakage occur in the branch line. The branch line extends from the outside to the inside of a building, wherein the indoor and the outdoor are distinguished based on a water meter.

However, in terms of management of the water pipe, the outdoor pipe is managed by a water service provider (in Korea, a local government), and the indoor pipe is managed by a user (a house owner). Accordingly, when leakage occurs outdoors, the water service provider is responsible, but when leakage occurs indoors, the user (the house owner) is liable for charges related water loss.

To solve this problem, various technologies for detecting water leaks by installing a leak detector in the water pipe have been developed and applied, but the conventional leak detector is configured only to detect leakage, and not to identify whether the leakage location is indoor or outdoor. As a result, in order to identify whether the leakage location is indoors or outdoors, a related public official or the like should visit the site to check and deal with the leak. In other words, the conventional leak detector is inefficient in that in the case of an indoor leakage, the related public official is only able to notify the building owner of the indoor leak and tell to building owner to repair it. However, the related public official should still travel to the site for this simple checking and notification.

Further, to solve above mentioned problems, there has been proposed a leak detector for detecting leakage and a leakage location by detecting leakage of water and tracking a location of the leakage, but it is problematic because the detector has a complex configuration, it is difficult to install, it is expensive, and frequent breakdown may occur.

Further, in a current system, a meter reader reads each water meter and reports (inputs) the meter display information to a management department, whereby the management department charges rates based on the meter display information input by the meter reader, but it is problematic in that it is impossible to identify whether the meter reader has actually read each water meter, or has arbitrarily input the meter display information.

SUMMARY

Accordingly, the present invention has been made keeping in mind the above problems occurring in the related art, and the present invention is intended to propose a water meter and a water supply management system using the same, which are capable of not only metering water used, but also identifying whether leakage has occurred and whether the leakage location is indoor or outdoor.

The present invention is further intended to propose a water meter and a water supply management system using the same, which induce a meter reader to actually perform reading of the water meter and to input meter display information obtained by actually reading the water meter, whereby it is possible to manage and check the water meter.

In order to achieve the above object, according to some aspects of the present invention, there is provided a water meter including: a reading unit provided in a meter body to display a measurement of water flow of water supplied through a water pipe; a sensing unit provided in the meter body to detect vibrations transmitted through the water pipe; a conversion unit for converting the vibrations detected by the sensing unit into electric signals; a frequency analysis unit for analyzing frequency components of the electric signals converted by the conversion unit; a comparison-processing unit for comparing each of the frequency components of the analyzed electric signals to a predetermined set-up level, and identifying whether each of the frequency components exceeds the predetermined set-up level; a determination-control unit for calculating a leakage probability on a basis of results from the comparison-processing unit; and an output unit for outputting a determination result of the determination-control unit as at least one of a video signal and an audio signal.

Herein, it is preferred that the determination-control unit calculates days of leakage according to the results from the comparison-processing unit, and controls the calculated days of leakage to be displayed through the output unit.

Further, it is preferred that the video signal output from the output unit is displayed as an encrypted text.

Further, it is preferred that the determination-control unit is configured such that in a case of leakage determined according to the results from the comparison-processing unit, indoor leakage or outdoor leakage is determined by identifying information on supply flow and supply duration from the reading unit during a leakage detection period, and the determination result is output through the output unit.

Further, it is preferred that the water meter further includes a communication unit for sending and receiving data to and from an external device.

Further, it is preferred that the water meter further includes a hydraulic pressure measurement unit provided in the meter body to measure pressure of water supplied through the water pipe, wherein information obtained by the hydraulic pressure measurement unit is output through the output unit.

Further, it is preferred that the water meter further includes a turbidity measurement unit provided in the meter body to measure turbidity of water supplied through the water pipe, wherein the information obtained by the turbidity measurement unit is output through the output unit.

Further, it is preferred that the sensing unit, the conversion unit, the frequency analysis unit, and the comparison-processing unit are integrally modularized and detachably coupled to the meter body; and the output unit is detachably coupled to the meter body.

In order to achieve the above object, according to some aspects of the present invention, there is provided a water supply management system including: the water meter; a management server for storing and managing the information by receiving leakage information, meter display information, and indoor and outdoor leakage information detected from water meters; and a monitoring display unit for displaying a map showing locations of the water meters, and displaying the leak information, the meter display information, and the indoor and outdoor leakage information of each water meter received from the management server.

Herein, it is preferred that the water supply management system further includes a communication device for transmitting the leak information, the meter display information, and the indoor and outdoor leakage information from the water meter to the management server through a communication network.

In order to achieve the above object, according to some aspects of the present invention, there is provided a water supply management system including: the water meter; a management server configured to receive and convert encrypted text information of the water meter read by a meter reader into normal data, and extract amount of usage, leakage probability, and days of leakage, thereby identifying whether normal reading is performed; and a monitoring display unit for displaying information extracted by converting the encrypted text information in the management server, and displaying information on whether normal meter reading has been performed by the meter reader.

According to the present invention having the above-described characteristics, it is possible not only to meter water but also to identify whether leakage has occurred, and to identify whether a leakage location is indoor or outdoor since a water meter according to the present invention is configured to have a leakage detection function.

Accordingly, the water meter according to the present invention is advantageous in that since an administrator (including a meter reader) or a user can check the leakage detection information, a leak management agent is allowed to replace or repair the leaking water pipe, and it is possible to reduce manpower for unnecessary inspection in terms of waterworks authority.

The water meter according to the present invention is further advantageous in that since meter display information of the water meter is displayed encrypted, it is possible to identify whether the meter reader actually has read the meter based on a result of the meter reading.

A water supply management system according to the present invention is advantageous in that since the water supply management system is allowed to receive, store, and manage leakage detection information of a plurality of water meters, and is allowed to display detection information of each water meter, along with map information on a screen of a display unit, showing a degree of leakage and a leakage location according to locations of water meters, thereby it is possible to easily manage water supply.

The water supply management system according to the present invention is further advantageous in that since meter display information of the water meter is displayed encrypted to induce meter readers to normally perform reading, it is possible to increase reliability of waterworks management by identifying whether the meter reader has checked the encrypted meter display information.

DETAILED DESCRIPTION

Figure 1:
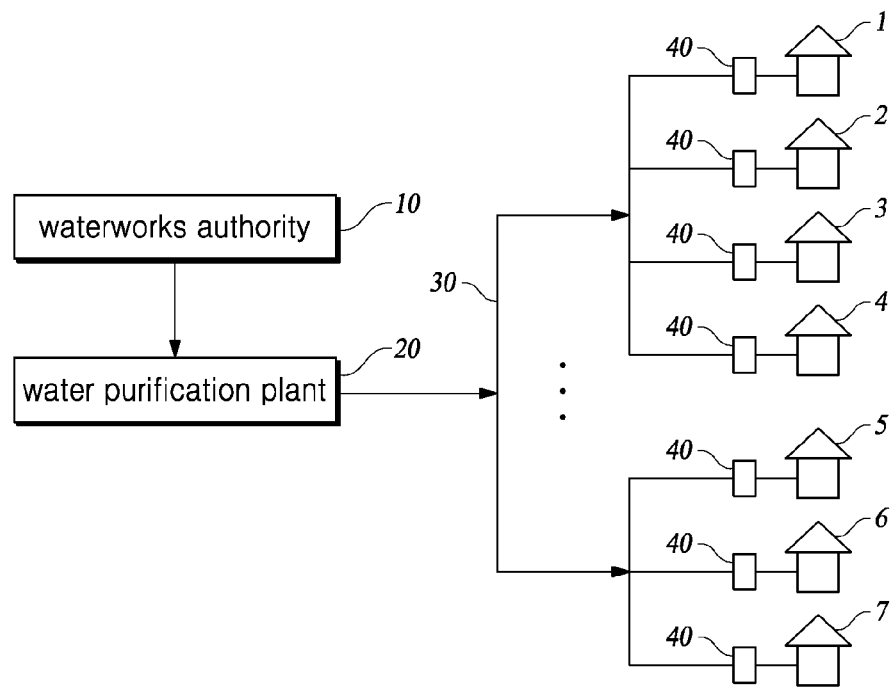
FIG. 1 is a schematic view showing an installation location of a water meter according to an embodiment of the present invention.
Figure 2:
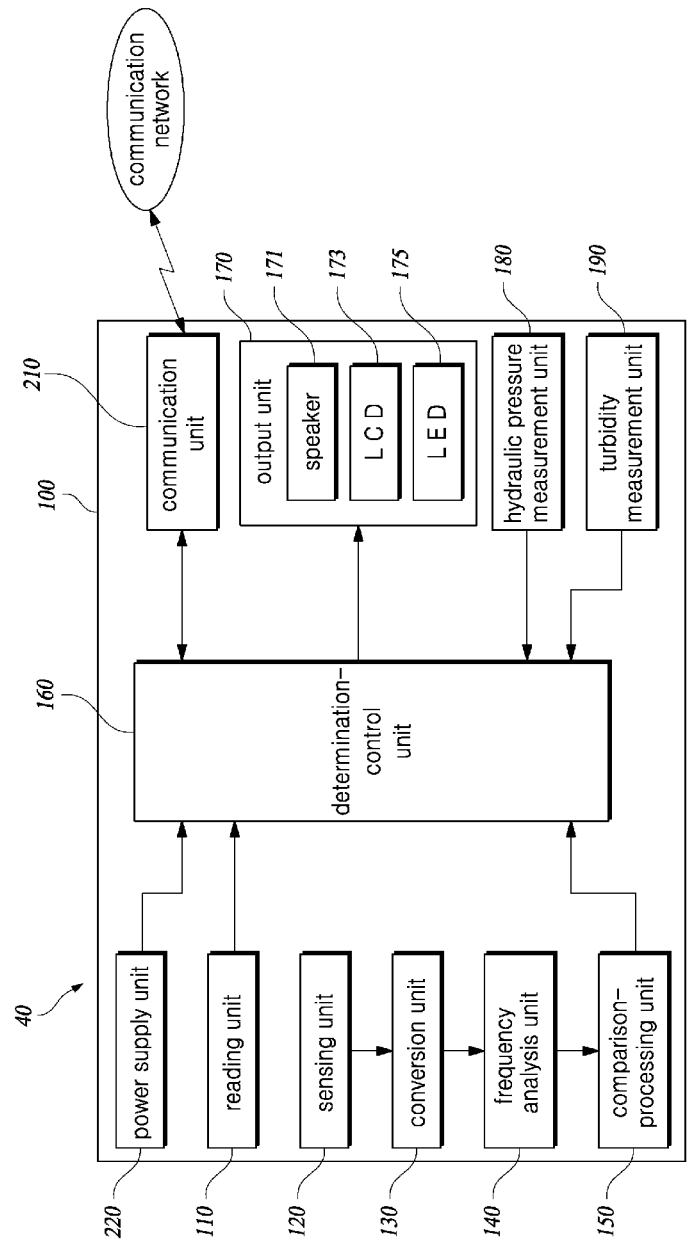
FIG. 2 is a block diagram showing the water meter according to the embodiment of the present invention.
Figure 3:
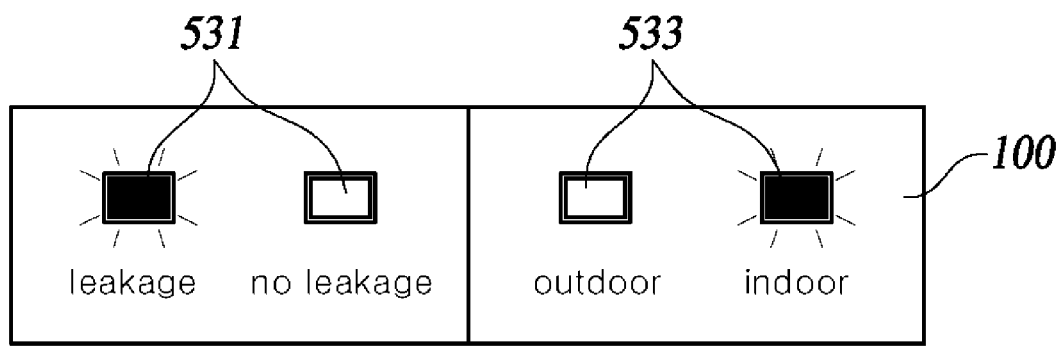
FIG. 3 is a view showing an operation for displaying leakage information using LEDs.

Reference will now be made in greater detail to a water meter according to exemplary embodiments of the present invention, and to a water supply management system using the same, with reference to the accompanying drawings.

Referring to FIGS. 1 to 4, a water meter 40 of the present invention is configured to detect a leak and an amount of flow of water supplied from a water purification plant 20 to each place 1~7 through a water pipe 30, wherein the water meter is capable of accurately detecting whether a leakage location is indoor or outdoor. Herein, the water purification plant 20 is managed by a waterworks authority 10, and the waterworks authority 10 may be a local government or a private management agency.

The water meter 40 according to an embodiment of the present invention includes: a reading unit 110 provided in a meter body 100 to display a measurement of water flow supplied through a water pipe 30; a sensing unit 120 provided in the meter body 100 to detect vibrations transmitted through the water pipe 30; a conversion unit 130 for converting the vibrations detected by the sensing unit 120 into electric signals; a frequency analysis unit 140 for analyzing frequency components of the electric signals converted by the conversion unit 130; a comparison-processing unit 150 for comparing each of the frequency components of the analyzed electric signals to a predetermined set-up level, and identifying whether each of the frequency components exceeds the predetermined set-up level; a determination-control unit 160 for calculating a leakage probability on a basis of results from the comparison-processing unit 150; an output unit 170 for outputting a determination result of the determination-control unit 160 as at least one of a video signal and an audio signal; a hydraulic pressure measurement unit 180; a turbidity measurement unit 190; a communication unit 210; and a power supply unit 220. Herein, the meter body 100 may be detachably provided on the water pipe 30, and may be configured to have a housing structure that has an inner space for accommodating other components therein. The meter body 100 may have an outer appearance similar to that of a publicly known water meter.

The reading unit 110 is provided in the meter body 100 to measure an amount of tap water flowing through the water pipe 30. The reading unit 110 may have a configuration the same or similar to that of a conventional water meter, and detailed description thereof will be omitted since those skilled in the art may easily understand the configuration from publicly known art. An amount of water usage read from the reading unit 110 is transmitted to the determination-control unit 160, and the determination-control unit 160 allows meter display information to be displayed as encrypted text through an LCD 173 of the output unit 170.

The sensing unit 120 is provided in the meter body 100 to detect vibrations generated from the water pipe 30, and a detected signal is transmitted to the conversion unit 130.

As an example of the sensing unit 120, 'Leak sensing apparatus (Korean Patent No. 10-2012-0134408)' discloses a configuration configured to detect leakage by collecting sounds of a water pipe using a tremor plate, and detailed description thereof will be omitted since those skilled in the art may easily understand the configuration from publicly known art.

The conversion unit 130 converts the vibrations detected by the sensing unit 120 into electric signals, and the converted electric signals are transmitted to the frequency analysis unit 140.

The frequency analysis unit 140 analyzes frequency components of the electric signals converted by the conversion unit 130, and each of the frequency components of the analyzed electric signals is transmitted to the comparison-processing unit 150.

The comparison-processing unit 150 identifies whether each of the frequency components of the electric signals analyzed in the frequency analysis unit 140 exceeds a predetermined set-up level, and identifies whether frequency components exceeding the predetermined set-up level are detected by repeating this process.

Then, the identified information in the comparison-processing unit 150 is transmitted to the determination-control unit 160.

The determination-control unit 160 determines whether leakage has occurred by calculating a leakage probability on the basis of results from the comparison-processing unit 150. Further, the determination-control unit 160 controls a determination result of whether leakage has occurred to be output through the output unit 170.

The output unit 170 includes: a speaker 171 for outputting the determination result of the determination-control unit 160 as an audio signal; a display unit 173 (the LCD); and a lighting unit 175 (LEDs). The speaker 171 is controlled by the determination-control unit 160 to allow a user (a building owner) or a meter reader to easily recognize information by outputting information on leakage and leakage location of the water pipe as the audio signal.

The display unit 173 is provided in the meter body 100 to allow the user or the meter reader to check information by outputting the information about the leakage and the leak location on the water pipe with letters or other symbols. Herein, it is more preferred that the determination-control unit 160 controls encrypted text information (identification information) including special characters or numbers to be output through the display unit 173. Accordingly, since the meter reader is allowed to identify and write the encrypted text information through the display unit 173 and the meter reader inputs the information in a management department or a management server 310 later, it is possible to supervise and manage whether the meter reader actually reads the meter or identifies the leak, by identifying and verifying the input meter display information.

Figure 4:
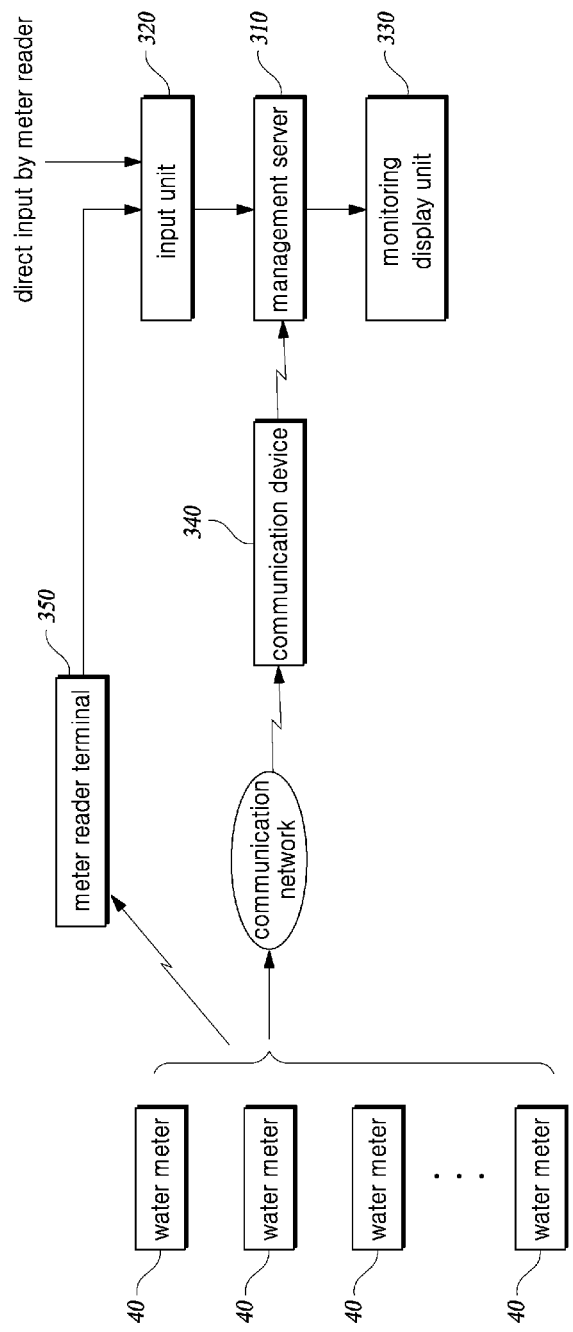
FIG. 4 is a schematic diagram showing a water supply management system according to the embodiment of the present invention.

The lighting unit 175 may include a plurality of LEDs, and may selectively light a plurality of LEDs on so as to display whether leakage has occurred, and to display the leakage location. In other words, as shown in FIG. 4, a side of the meter body 100 is provided with LEDs 531 for displaying leakage or no leakage, and provided with LEDs 533 for displaying outdoor leakage or indoor leakage, whereby the LEDs are selectively lit such that the user and the meter reader visually check the information.

Hereinbelow, a display method for the encrypted text information (identification information) will be described with reference to FIGS. 5 and 6.

In other words, the display unit 173 is provided outside the meter body 100, and is provided with partitioned parts for displaying the leakage probability, the days of leakage, the indoor leakage, and the outdoor leakage as well as a flow value (a meter reading value).

Figure 5:
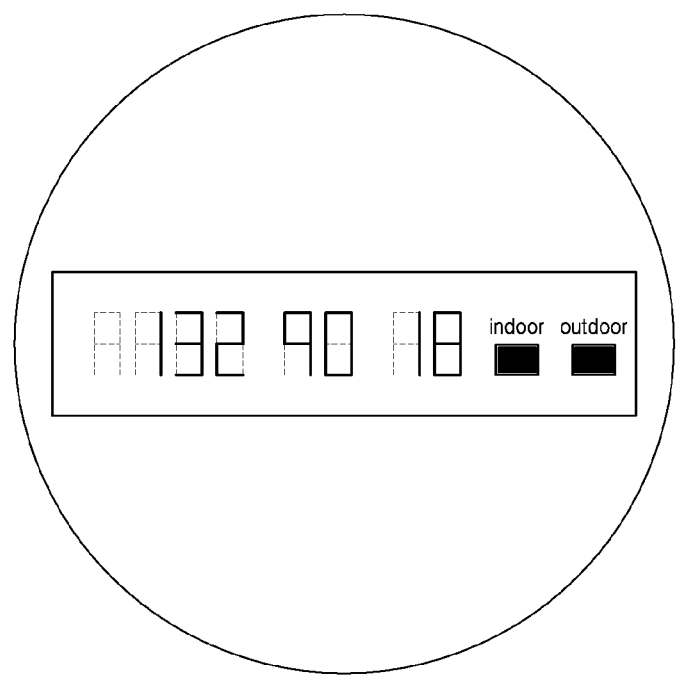
FIG. 5 is a view showing method for displaying meter values without using encrypted text.
Figure 6:
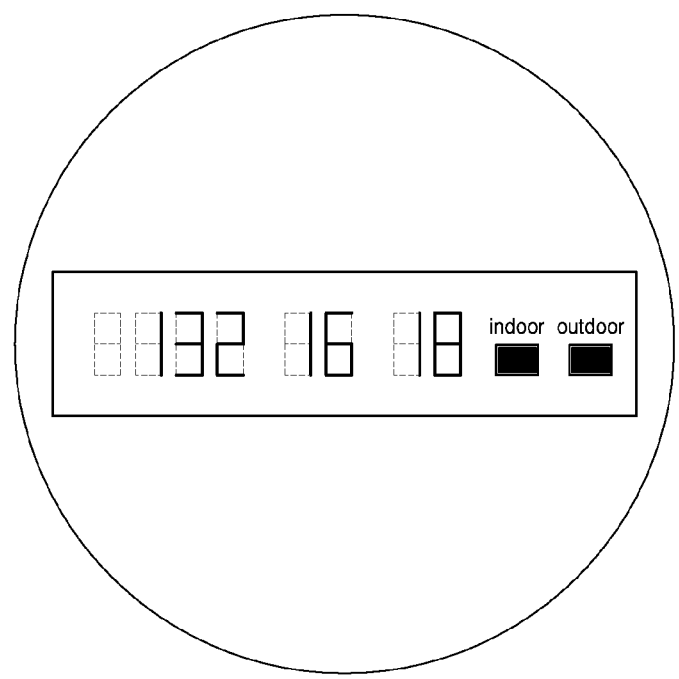
FIG. 6 is a view showing a method for a displaying meter values using encrypted text.

FIG. 5 is a view showing method for displaying meter values without using encrypted text; and FIG. 6 is a view showing method for displaying meter values using encrypted text.

As shown in FIGS. 5 and 6, as an example of the display method, the display unit 173 may display in an order of 'amount of usage+leakage probability+days of leakage'. Herein, the display unit 173 shows the amount of usage=132, the leakage probability=90, and days of leakage=18 days, using numbers, wherein in FIG. 5, the amount of usage, the leakage probability, and the days of leakage are displayed as normal digital signals (numbers); and in FIG. 6, the leakage probability is displayed encrypted.

In other words, the encrypted leakage probability may be displayed as a sum of the following numbers: the last number of a serial number of a water meter; the first number of the serial number of the water meter; and a leakage probability/10'. Herein, it is assumed that the leakage probability is displayed only in multiples of ten, such as 10, 20, and 30.

Accordingly, assuming that the serial number of the water meter is '123456', in the encrypted leakage probability part of the display unit 173, number 16 (1+6+90/10) is displayed. In other words, in the case of 90% of leakage probability, the encrypted leakage probability (encrypted text) is actually displayed as number 16. Since the meter reader cannot interpret the encrypted text, if the meter reader reported, for example, that the leakage probability is 32, the meter reader is considered not to have actually read the meter. In other words, it is impossible to be displayed as number 32 of the leakage probability in the water meter.

The above example is described for understanding, so the encryption method may be, for example, a method of combination of the date of the day (possible to calculate the date using a counter of internal CPU), and of course, the encryption method may be applied to the amount of usage and the days of leakage.

As described above, when the meter reader reads and reports the encrypted meter display information, in other words, when the meter reader reports the information by reporting the information into the management department or imputing it into the management server 310, and the reported meter measurement number is input into a predetermined program (a program for decrypting the information, generating normal numbers, and telling a case where meter reading is not performed), it is possible to secure a meter reading value for charging, and is possible to find an arbitrarily imposed water meter.

The hydraulic pressure measurement unit 180 is provided in the meter body 100 to measure pressure of water supplied through the water pipe, wherein a measured value may be sent to the determination-control unit 160 and the measured hydraulic pressure value may be output through the output unit 170.

The turbidity measurement unit 190 is provided in the meter body 100 to measure turbidity of water supplied through the water pipe, wherein a measured value may be sent to the determination-control unit 160 and the measured turbidity value may be output through the output unit 170. Accordingly, the user or the meter reader can check both of the hydraulic pressure and the turbidity value, and can provide them to the management department or the management server 310.

The communication unit 210 is provided in the meter body 100 to communicate wirelessly or by wire with an external device, for example, another communication terminal, a wireless communication device, etc., such that the meter display value and the measured value including leakage or no leakage, indoor or outdoor leakage, days of leakage are transmitted to the external device or the management server 310. The communication unit 210 may include a wired communication port or a wireless communication antenna.

To be more specific, the communication unit 210 remotely transmits leakage and leakage location information of the water pipe 30, and may include an antenna connected to the determination-control unit 160. The data sent from the communication unit 210 may be provided to an administrator terminal or a user terminal, such as PDA that meter readers carry with for reading, by using a wireless communication network. In other words, when leakage occurs, the determination-control unit 160 transmits leakage location information along with the leakage information, to the administrator terminal or the user terminal according to the leakage location. In the case of outdoor leakage, leakage information is transmitted to the administrator terminal or the management server 310; and in the case of indoor leakage, leakage information is transmitted to a pre-registered user terminal and the management server 310, such that an administrator or a user takes follow-up action by checking the leak.

Further, days of leakage as well as leakage information and leakage location may be transmitted through the communication unit 210; and information on measurement of flow, leakage, leakage location, days of leakage, etc. may be transmitted to the management server 310 of the waterworks authority as well as the administrator terminal or the user terminal. In this case, the management server 310 may be configured to notify the administrator terminal or the user terminal of information on leakage, leakage location, and days of leakage.

The power supply unit 220 is for supplying power that is required to operate the water meter 40, wherein the power supply unit may include a rechargeable battery, and may be configured to supply power by being directly connected to a power line.

The water meter 40 according to the embodiment of the present invention configured as described above determines whether leakage occurs, and identifies indoor leakage or outdoor leakage when the leakage occurs.

In other words, in the case where the determination-control unit 160 identifies that the frequency that is obtained by converting vibration frequency detected by the sensing unit 120 into electric signals and analyzing the same exceeds the predetermined set-up level, whether there is indoor use of water is checked by using meter display information through the reading unit 110. As a result of checking, when the indoor use is identified, it is judged as indoor leakage, and indoor leakage information is output through the output unit 170 and days of leakage is counted and displayed.

On the contrary, in the state where the determination-control unit 160 identifies signs of leakage, when the reading unit 110 shows that there is no flow of water indoors, the determination-control unit 160 judges that there is outdoor leakage. Accordingly, in this case, the determination-control unit 160 outputs outdoor leakage information through the output unit 170 to allow the meter reader and the user to check.

Here, as described above, information on the meter reading value, the leakage probability, days of leakage, and the like is shown as the encrypted text, and after the meter reader checks the encrypted text through actually reading the meter, the meter reader may directly input the encrypted text into the management server 310 through the input unit 320.

In other words, since the meter reader checks the water meter 40 monthly, when the meter reading value and leakage are checked, the management server 310 or the management department can check a leakage detection result, and since the waterworks authority knows the address of each water meter, it is possible to check a leak status on the map by the management server 310 displaying a reading data of the meter reader on the map shown in the display unit 330.

Of course, considering installation and management costs, by building a communication device 340 and the communication network, the management agency can remotely check the reading result and leakage of each of the water meters 40, every day, whereby it is possible to realize remote real-time monitoring.

Further, according to the water meter 40 and the management system of the present invention, since it is possible not only to identify leakage or no leakage, and the leakage location (indoor or outdoor), but also to identify days of leakage, it is possible to accurately calculate the amount of leakage, and thereby it is possible to accurately calculate loss. Further, since it is possible to clearly know whether the homeowner or the management agency is responsible for the loss according to the leak determination result, it is possible to realize more transparent waterworks management, whereby it is possible to reduce complaints.

Further, since the leak determination result is shown as encryption text that is changed every day by each water meter, it is impossible to check and input the encrypted text (password code) without the meter reader actually reading the meter. Accordingly, it is possible to prevent the meter reader from arbitrarily charging without actually reading the meter, whereby it is possible to induce the meter reader to properly read the meter.

Figure 7:
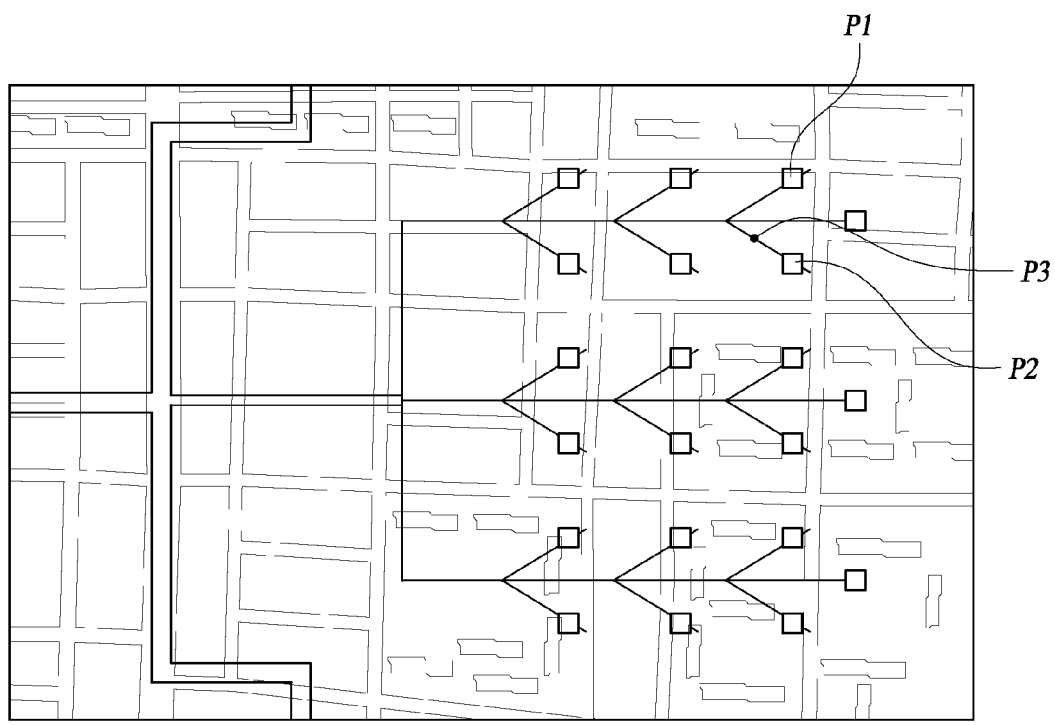
FIG. 7 is a view showing a state where a water supply map is displayed on a monitoring display unit.

FIGS. 4 and 7 are views showing a water supply management system according to the embodiment of the present invention, wherein the water supply management system includes: the water meter 40 according to the embodiment of the present invention; the management server 310; the input unit 320; the display unit 330; and the communication device 340.

The water meter 40 is configured as described above, and may be further configured to transmit the meter reading value and the leakage information (including the leakage probability, the leakage location, and the days of leakage) to the remote management server 310 through the communication network, or configured to input the information into the input unit 320 by using a the meter reader terminal 350 or directly input the information into the input unit 320 by the meter reader.

In other words, each water meter 40 provided a plurality of locations of the water pipe may be configured such that the meter display information and the leakage information are output through its own output unit 170, and in some cases, the meter display information and the leakage information are transmitted to the meter reader terminal 350 through the communication unit 210 or transmitted to the management server 310 through the remote communication device 340.

The management server 310 stores and manages the information by receiving the meter display information and the leakage information detected from a plurality of water meters 40. Here, the information detected by each water meter 40 may be directly transmitted to the management server 31 through the communication network, may be transmitted to the management server 31 through the meter reader terminal 350, or may be transmitted to the management server 31 by the meter reader directly inputting through the input unit 320 (a computer device, etc.). As shown in FIG. 7, the management server 310 displays a location of the water meter 40 on the map through the monitoring display unit 330, and may be configured to control colors of points P1 and P2 of water meters to be different based on a degree of leakage by the water meter.

Further, when the management server 310 receives the leakage information from neighboring water meters 40, the points P1 and P2 of water meters that have detected leakage information, along with the map information, are displayed through a screen of the monitoring display unit 330, and point P3 nearer the water meter of the neighboring water meters, which detects the leakage more strongly, may be shown as a leak point. Accordingly, it is possible for the administrator to accurately predict an actual leakage location and manage it.

In other words, when the water meters provided at point P1 and point P2 respectively detect vibrations, it is quite probable that the water meter having detected bigger vibrations is nearer the leakage location. For example, assuming that a length of the water pipe between point P1 and point P2 is $9m$, a size of vibrations of point P1, which is detected by the water meter, is 5, and a size of vibrations of point P2 is 5, it is quite probable that point P3 apart from the water meter of point P2 by 3 m and apart from the water meter of point P1 by 6 m is predicted as a leakage location. Accordingly, it is possible to easily find a leakage location and manage it by displaying the predicted leakage location on the map.

Further, the management server 310 displays a location of the water meter 40 along with the map information on the screen of the monitoring display unit 330, and the displayed water meter 40 is shown in different color based on a degree of leakage by the water meter, such that the administrator can easily identify it.

Further, the management server 310 calculates an expected degree of leakage based on the leakage information and the meter display information collected from each water meter 40 through the monitoring display unit 330, and the calculated information may be allowed to be displayed as a lookup table or a graph.

Further, the management server 310 is configured to be capable of judging whether each of the meter readers actually reads the water meter 40 by receiving the meter display information (the encrypted text) of the water meter 40 from the meter reader terminal 350 (the administrator terminal) or by checking the information directly input by the meter reader. As described above, since the encrypted text for each meter reader is used to identify actual meter reading, the management server 310 can perform evaluation and work management of each meter reader, and the meter reader is induced to perform good meter reading work.

Figure 8:
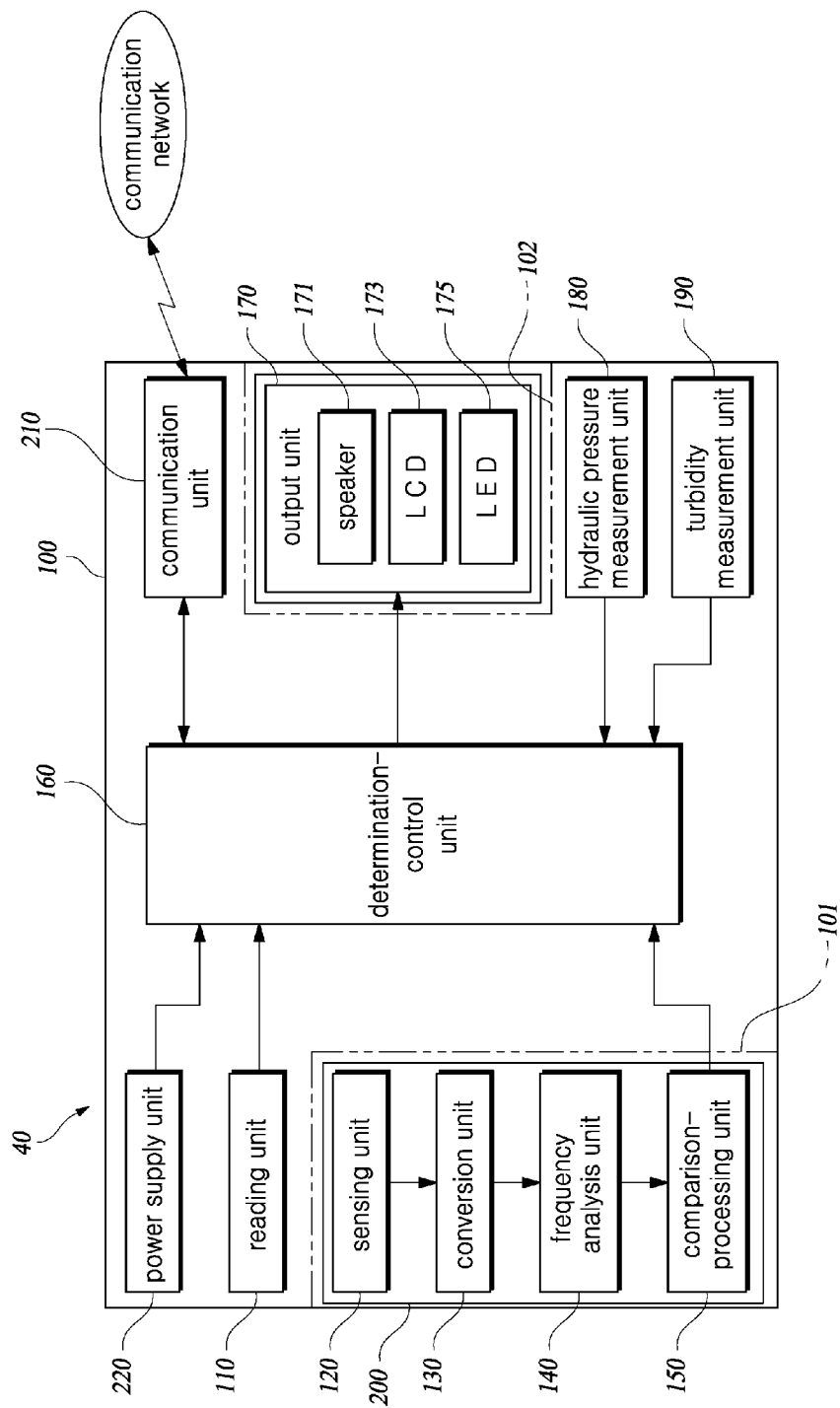
FIG. 8 is a schematic block diagram showing a water meter according to another embodiment of the present invention.

Further, as shown in FIG. 8, the sensing unit 120, the conversion unit 130, the frequency analysis unit 140, and the comparison-processing unit 150 may be integrally modularized to be a so-called leakage detection module 200, wherein the integrally modularized leakage detection module 200 may be detachably coupled to a first mounting part 101 provided in the meter body 100. As described above, since the leakage detection module 200 is configured to be modularized and to be detachably coupled to the meter body 100, when the reading unit 110 of the water meter deteriorates and needs to be replaced, it is possible to recycle the leakage detection module 200 by detaching it from the meter body.

Further, it is possible to provide the water meter in a state where the leakage detection module 200 is detached from the water meter, at the request of customer.

Further, the output unit 170 may be detachably coupled to the meter body 100. To achieve this, the meter body 100 may be provided with a second mounting part 102 for allowing the output unit 170 to be detachably mounted thereto. Accordingly, it is possible to separately provide the output unit 170, and possible to recycle it.

Herein, the first and the second mounting parts 101 and 102 may be in various shapes. For example, the meter body 100 may be configured to have a predetermined space for allowing the leakage detection module 200 and the output unit 170 to be detachably coupled to an inner or an outer surface of the meter body, or may be configured to be detachable using a connector after assembling using a bolt. In other words, various changes in configuration of and coupling means for the first and the second mounting parts 101 and 102 may be made, without being limited to a predetermined configuration.

Of course, not shown in the drawings, after the leakage detection module 200 and the output unit 170 are integrally modulized to be one module, the module may be detachably coupled to the meter body 100.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A water meter comprising:
   a reading unit provided in a meter body to display a flow of water supplied through a water pipe;
   a sensing unit provided in the meter body to detect vibrations transmitted through the water pipe;
   a conversion unit for converting the vibrations detected by the sensing unit into electric signals;
   a frequency analysis unit for analyzing frequency components of the electric signals converted by the conversion unit;
   a comparison-processing unit for comparing each of the frequency components of the analyzed electric signals to a predetermined set-up level, and identifying whether each of the frequency components exceeds the predetermined set-up level;
   a determination-control unit for calculating a leakage probability on a basis of results from the comparison-processing unit; and an output unit for outputting a determination result of the determination-control unit as at least one of a video signal and an audio signal.

2. The water meter of claim 1, wherein
the determination-control unit calculates days of leakage according to the results from the comparison-processing unit, and controls the calculated days of leakage to be displayed through the output unit.

3. The water meter of claim 1, wherein
the video signal output from the output unit is displayed as an encrypted text.

4. The water meter of claim 1, wherein
the determination-control unit is configured such that in a case of leakage determined according to the results from the comparison-processing unit, an indoor leakage or an outdoor leakage is determined by identifying information on supply flow and supply duration from the reading unit during a leakage detection period, and the determination result is output through the output unit.

5. The water meter of claim 1 further comprising:
a communication unit for sending and receiving data to and from an external device.

6. The water meter of claim 1 further comprising:
a hydraulic pressure measurement unit provided in the meter body to measure pressure of water supplied through the water pipe, wherein information obtained by the hydraulic pressure measurement unit is output through the output unit.

7. The water meter of claim 1 further comprising:
a turbidity measurement unit provided in the meter body to measure turbidity of water supplied through the water pipe, wherein the information obtained by the turbidity measurement unit is output through the output unit.

8. The water meter of claim 1, wherein
the sensing unit, the conversion unit, the frequency analysis unit, and the comparison-processing unit are integrally modularized and detachably coupled to the meter body; and the output unit is detachably coupled to the meter body.

9. A water supply management system comprising:
the water meter of claim 1;
a management server for storing and managing the information by receiving leakage information, meter display information, and indoor and outdoor leakage information detected from water meters; and
a monitoring display unit for displaying a map showing locations of the water meters, and displaying the leakage information, the meter display information, and the indoor and outdoor leakage information of each water meter received from the management server.

10. The water supply management system of claim 9, further comprising:
a communication device for transmitting the leakage information, the meter display information, and the indoor and outdoor leakage information from the water meter to the management server through a communication network.

11. A water supply management system comprising:
the water meter of claim 3;
a management server configured to receive and convert encrypted text information of the water meter read by a meter reader into normal data, and extract amount of usage, leakage probability, and days of leakage, thereby identifying whether normal reading is performed; and
a monitoring display unit for displaying information extracted by converting the encrypted text information in the management server, and displaying information on whether normal reading is performed by the meter reader.

* * * * *